(12) United States Patent
Sanchez et al.

(10) Patent No.: US 7,960,060 B2
(45) Date of Patent: Jun. 14, 2011

(54) IONIC CONDUCTING MATERIAL CONTAINING AN OLIGOETHER SULPHATE

(75) Inventors: Jean-Yves Sanchez, Saint Ismier (FR); Christophe Chauvin, Vaulx Milieu (FR); Fannie Alloin, Vézille (FR); Marc Deschamps, Quimper (FR)

(73) Assignee: Batscap, Ergue-Gaberic (FR)

( * ) Notice: Subject to any disclaimer, the term of this patent is extended or adjusted under 35 U.S.C. 154(b) by 1142 days.

(21) Appl. No.: 11/630,745

(22) PCT Filed: Jun. 27, 2005

(86) PCT No.: PCT/FR2005/001623
§ 371 (c)(1),
(2), (4) Date: Dec. 21, 2006

(87) PCT Pub. No.: WO2006/010843
PCT Pub. Date: Feb. 2, 2006

(65) Prior Publication Data
US 2007/0190428 A1    Aug. 16, 2007

(30) Foreign Application Priority Data
Jun. 28, 2004   (FR) ..................................... 04 07061

(51) Int. Cl.
*H01M 10/056*    (2010.01)
(52) U.S. Cl. ......... 429/309; 429/314; 429/317; 429/325
(58) Field of Classification Search .................. None
See application file for complete search history.

(56) References Cited

U.S. PATENT DOCUMENTS

| | | | | |
|---|---|---|---|---|
| 5,196,484 A | * | 3/1993 | Giles et al. ..................... | 525/314 |
| 5,700,880 A | * | 12/1997 | Sanchez et al. ................ | 525/403 |
| 6,620,546 B1 | * | 9/2003 | Michot et al. .................. | 429/188 |

OTHER PUBLICATIONS

Shu-Wen, Hu and Shi-bi Fang, Solid electrolyte based on an inorganic salt-organic salt hybrid system, Electrochimica Acta 44 (1999) pp. 2721-2726.*

H. Chen et al., "Single-Ion Conduction and Electrochemical Characteristics of Poly(Oxyethylene)/Lithium Methoxy Oligo(Oxyethylene) Sulfate Blend", J.M.S.—Pure Appl. Chem., 1996, pp. 1273-1281. vol. A33, No. 9.
Y. Zheng et al., "Single Ion Conduction in Lithium Methoxy Oligo(Oxyethylene) Sulfate-Comblike Polyether Complex", J.M. S.—Pure Appl. Chem., 1993, pp. 365-372, vol. A30, No. 5.
Y. Zheng et al., "Cationic Conduction in Oligoether Sale—Comblike Polyether Complex", J. Appl. Polym. Sci., Aug. 1995, pp. 623-629, vol. 57.
F.B. Dias et al., "Trends in polymer electrolytes for secondary lithium batteries", Journal of Power Sources, Jun. 2000, pp. 169-191, vol. 88, No. 2.
D. Benrabah, "Comparative Electrochemical Study of New Poly (oxyethylene)-Li Salt Complexes", J. Chem. Soc., Faraday Trans., Jan. 1993, pp. 355-359, vol. 89, No. 2.
B. Yang et al., "Study on Ionic Conductive Property of Polyurethane/Oligo-Ether Sulfate Complex", Eur. Polym. J., Sep. 2001, pp. 1813-1819, vol. 37, No. 9.
K. Xu et al., "Synthesis and Characterization of Lithium Sulfonates as Components of Molten Salt Electrolytes", Electrochimica Acta., Oct. 1995, pp. 2401-2403, vol. 40, No. 13. Great Britain.
W. Xu et al., "Ionic Conduction of Lithium Oligo(ethyleneoxy) Phenylsulfonate and its Complex with Poly(ethylene oxide)", Solid State Ionics, Sep. 1998, pp. 219-226, vol. 111, No. 3-4.
R.A. Colley et al., "Poly[oxymethylene-Oligo(oxyethylene)] for use in Subambient Temperature Electrochromic Devices", Jul. 2000, Polymer Int., pp. 371-376, vol. 49, No. 4.
International Search Report dated Nov. 4, 2005.

* cited by examiner

*Primary Examiner* — Dah-Wei D Yuan
*Assistant Examiner* — Maria J Laios
(74) *Attorney, Agent, or Firm* — Merchant & Gould

(57) ABSTRACT

The invention relates to an ion-conducting material containing an oligoether sulfate.
The material comprises an ionic compound dissolved in a solvating polymer. The ionic compound is a mixture of a lithium bis(trifluoromethanesulfonyl)imide and of at least one lithium oligoether sulfate chosen from the lithium oligoether monosulfates corresponding to the formula R—[O—$CH_2$—$CH_2$)]$_n$—O—$SO_3^-$Li$^+$(I) in which R is a group $C_mH_{2m+1}$ with $1 \leq m \leq 4$ and $2 \leq n \leq 17$, and the lithium oligoether disulfates corresponding to the formula Li$^+$O$^-$SO$_2$—O—$CH_2$—[$CH_2$—O—$CH_2$]$_p$—$CH_2$—O—$SO_2$—O$^-$Li$^+$(II) in which $3 \leq p \leq 45$; the overall ratio $O_t/Li_t$ is less than or equal to 40, $O_t$ representing the total number of O atoms provided by the solvating polymer and by the oligoether; the content of LiTFSI is such that the $O_t$/LiTFSI ratio is greater than or equal to 20.

19 Claims, No Drawings

IONIC CONDUCTING MATERIAL CONTAINING AN OLIGOETHER SULPHATE

The present invention relates to a solid polymeric electrolyte and also to uses thereof.

Solid polymeric electrolytes are used in various electrochemical systems, especially in rechargeable or nonrechargeable lithium electrochemical generators, in electrochromic systems and in supercapacitors. They may also be used for making composite electrodes especially for generators. The use of a solid polymeric electrolyte makes it possible to produce electrochemical devices of low thickness and of varied shapes.

A solid polymeric electrolyte consists essentially of a salt and a solvent, said solvent being, for example, a solvating polymer, or a polymer plasticized with a polar aprotic liquid solvent or a mixture of such liquid solvents. Among the solvating polymers that may be mentioned are ethylene oxide homopolymers (POE) and ethylene oxide copolymers.

The lithium salts are advantageously used, in particular when the electrolyte is intended for a battery, on account of the redox potential of the Li/Li$^+$ couple, which is at −3 volts relative to the normal hydrogen electrode and which gives generators of strong voltage. In addition, its high specific capacitance gives generators with high specific energy. In a battery in which the ionic compound is a lithium salt, the negative electrode may consist either of a lithium metal foil (lithium battery) or of a lithium insertion compound (lithium-ion battery).

As lithium salt for a solid polymeric electrolyte of a lithium battery, it is known practice to use perfluoro salts, especially such as lithium hexafluorophosphate (LiPF$_6$), lithium bis(trifluoromethanesulfonyl)imide (LITFSI) and lithium tris(perfluoromethanesulfonyl)-methylide (LiTFSM). LITFSI and LiTFSM are salts that are particularly suitable for solid polymeric electrolyte batteries that have a lithium negative electrode, since they give excellent conductivities. However, they are expensive, the presence of fluorine may have harmful effects on the environment, and they have a low cation transport number t$^+$.

Electrolytes containing a lithium oligoether sulfate as salt are described especially in Y. Zheng, et al., Pure Applied Chemistry, A30(5), 365-372 (1993). Said document describes the preparation of a lithium salt of an oligo(oxyethylene) sulfate, and the formation of a complex with a poly[methoxyoligo(oxyethylene) methacrylate-co-acrylamide] [P(MeO$_{16}$-AM].

H. Chen, et al., Pure Applied Chemistry, A33(9), 1273-1281 (1996) describe the behavior of an electrolyte consisting of a lithium salt of an oligo(oxyethylene) sulfate dissolved in a POE. The properties are compared with those of the complexes described in the abovementioned publication.

X. Ollivrin (thesis viva held on 6 May 1999 at the Institut National Polytechnique de Grenoble) describes the preparation of various ethylene oxide oligomers bearing a lithium sulfate end group (POEMS) or two lithium sulfate end groups (POEDS), and also their use as electrolyte in the form of a solution in POE. The performance of the POEMS/POE and POEDS/POE electrolyte is compared with that of the LiTFSI/POE electrolyte. It appears that a polymeric electrolyte containing LITFSI gives high ion conductivity, but a relatively low cation transport number, whereas an electrolyte containing a POEMS or a POEDS has a higher cation transport number but a lower ion conductivity.

An ion-conducting material is characterized especially by an ion conductivity ($\sigma$), a cation transport number (t$^+$) and a cation conductivity ($\sigma_+$), which is the product of the ion conductivity multiplied by the cation transport number ($\sigma_+ = \sigma * t^+$).

When an ion-conducting material containing a lithium salt as ionic compound is used as battery electrolyte, the only species that participates in the electrochemical reactions is the lithium cation. The cationic conductivity in particular reflects the mobility of the lithium cation in the polymeric electrolyte under an electric field. The battery performance will theoretically be higher if the cationic conductivity value is higher.

The performance (cation transport number, ionic or cationic conductivity) of materials containing either LiTFSI or an oligoether sulfate is known. It appears that, overall, the former have a low cation transport number and a high ionic conductivity, whereas the latter have a high transport number and low conductivity. F. Alloin, et al., (Journal of Power Sources 68 (1997) 372-376) have determined the cation transport number t$^+$ of LiTFSI, of an ionomer DaaR$_f$SO$_3$Li (Daa representing a diallylamide group) and of a mixture of a DaaR$_f$SO$_3$Li ionomer and of LiTFSI, each dissolved in a crosslinked polyether solvent. The t$^+$ of LiTFSI remains low, of the order of 0.1, for values of the ratio O/Li for the material LiTFSI+polyether, which are compatible with the use of the material as an electrolyte. The t$^+$ of the ionomer is very high, close to 1. However, the authors observe that the t$^+$ of a material containing a mixture of LiTFSI and of DaaR$_f$SO$_3$Li remains practically equivalent to that of the material containing LiTFSI alone, i.e. at a low value, whereas it might have been hoped to obtain a value intermediate between that given by LiTFSI and that given by DaaR$_f$SO$_3$Li.

The present inventors have now found, surprisingly, that the combined use of a lithium oligoether sulfate and of LiTFSI dissolved in a solvating polymer to form an ion-conducting material gives a synergistic effect and makes it possible to obtain an improved cation transport number compared with that of an ion-conducting material containing LiTFSI as sole source of Li dissolved in a solvating polymer. This phenomenon is particularly advantageous insofar as LiTFSI, which is a relatively toxic compound due to the fact that it is perfluorinated, may be partially replaced with a less toxic compound, whose preparation is less expensive and whose recycling would be easier.

One subject of the present invention is, consequently, an ion-conducting material comprising at least one ionic compound dissolved in a solvating polymer, characterized in that:
- the ionic compound is a mixture of a lithium bis(trifluoromethanesulfonyl)imide (LiTFSI) and of at least one lithium oligoether sulfate chosen from the lithium oligoether monosulfates corresponding to the formula R—[O—CH$_2$—CH$_2$)]$_n$—O—SO$_3$$^-$Li$^+$ (I) in which R is a group C$_m$H$_{2m+1}$ with $1 \leq m \leq 4$ and $2 \leq n \leq 17$, and the lithium oligoether disulfates corresponding to the formula Li$^+$O—SO$_2$—O—CH$_2$—[CH$_2$—CH$_2$]$_p$—CH$_2$—O—SO$_2$—O—Li$^+$ (II) in which $3 \leq p \leq 45$,
- the overall ratio O$_t$/Li$_t$ is less than or equal to 40, O$_t$ representing the total number of O atoms provided by the solvating polymer and by the oligoether,
- the LiTFSI content is such that the ratio O$_t$/LiTFSI is greater than or equal to 20.

In the text hereinbelow, a lithium oligoether monosulfate is referred to as POEMS and a lithium oligoether disulfate is referred to as POEDS.

Besides an unexpected synergistic effect of the combination between LiTFSI and a lithium oligomer sulfate, which will be demonstrated hereinbelow, the present invention not only has the advantage of affording a saving by means of the partial replacement of LiTFSI with the oligomer, but also an ecological advantage resulting from this replacement.

A solvating polymer that may be used as solvent for the ionic compound is a polymer in which the salt is soluble and partially or totally dissociated into cation and anion, without phase separation between the polymer and the salt. Examples that may be mentioned include homopolymers and copolymers of ethylene oxide, of propylene oxide or of dioxolane. Mention may also be made of copolymers of ethylene oxide and of a crosslinkable comonomer (for example allyl glycidyl ether). Ethylene oxide homopolymers, ethylene oxide copolymers and poly(oxyethylene)-based networks are particularly preferred. It is possible to use ethylene oxide homopolymers and copolymers of varied molar masses, for example a POE homopolymer with a molar mass of 100 000 g/mol or $5\times10^6$ g/mol. When a one-dimensional solvating polymer is used, it is preferable for it to have a mass of greater than 100 000 g/mol to ensure sufficient mechanical strength.

The solvating polymer may optionally be plasticized by addition of a plasticizer chosen from polar aprotic liquid solvents, the amount of liquid solvent being less than 30% by weight and preferably between 5% and 10% by weight. The plasticizer may be chosen, for example, from ethylene carbonate, propylene carbonate, γ-butyrolactone, dimethylformamide, N-methylpyrrolidone, tetraalkylsulfamides, polyethylene glycol dimethyl ethers with a mass of between 200 and 2000, and, in general, polar molecule derivatives of low volatility.

According to one preferred embodiment of the invention, the ionic compound of the ion-conducting material is a mixture of LiTFSI and of a POEMS of formula (I) in which R is a methyl group and n is between 2 and 17 and preferably $n \leq 12$.

According to another preferred embodiment of the invention, the ionic compound of the ion-conducting material is a mixture of LiTFSI and of a POEDS of formula (II) in which p is between 3 and 45 and preferably $p \leq 12$.

The lithium oligoether sulfates are obtained via synthetic processes that are well known to those skilled in the art.

An oligoether monosulfate R—[O—CH$_2$—CH$_2$)]$_n$—O—SO$_3^-$Li$^+$ is obtained via a two-step process in which:

in the first step, the alcohol function of a compound R—[O—CH$_2$—CH$_2$)]$_n$—OH is esterified by addition of chlorosulfonic acid, in anhydrous medium and while flushing with a neutral gas, according to the following reaction scheme:

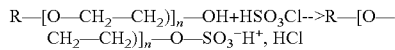
R—[O—CH$_2$—CH$_2$)]$_n$—OH+HSO$_3$Cl-->R—[O—CH$_2$—CH$_2$)]$_n$—O—SO$_3^-$H$^+$, HCl in the second step, the compound obtained is neutralized with an alkali metal hydroxide (for example LiOH) according to the following reaction scheme:

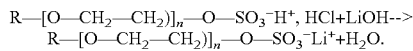
R—[O—CH$_2$—CH$_2$)]$_n$—O—SO$_3^-$H$^+$, HCl+LiOH-->
R—[O—CH$_2$—CH$_2$)]$_n$—O—SO$_3^-$Li$^+$+H$_2$O.

For the first step, a solvent that is insensitive or sparingly sensitive to acids is chosen, for example a chlorinated solvent such as dichloromethane. It is preferable to add the chlorosulfonic acid slowly to R—[O—CH$_2$—CH$_2$)]$_n$—OH on account of the highly exothermic nature of the reaction. A slight excess of chlorosulfonic acid is used to take into account the traces of water.

For the second step, an excess of alkali metal hydroxide is preferably used to compensate for the acidic impurities arising from the first step.

To limit the drawbacks associated with the presence of water in the first step, the compound R—[O—CH$_2$—CH$_2$)]$_n$—OH is preferably subjected to preliminary drying at 80° C. under dynamic vacuum.

The compounds R—[O—CH$_2$—CH$_2$)]$_n$—OH are products sold especially by the company Aldrich.

A lithium oligoether disulfate Li$^+$O$^-$SO$_2$—O—CH$_2$—[CH$_2$—O—CH$_2$]$_p$—CH$_2$—O—O$_2$—O$^-$Li$^+$ is obtained according to a similar process starting with the corresponding poly(oxy-ethylene) glycol.

The ion-conducting material according to the present invention is obtained by mixing one or more lithium oligoether sulfates, LITFSI, a solvating polymer and a plasticizer for said polymer, where necessary. Various additives chosen, for example, from mineral fillers, the lithium salts conventionally used in ion-conducting materials, organic fillers of cellulose type, and flame retardants may be added. The addition of propylene carbonate as plasticizer also makes it possible to increase the dielectric constant and to improve the dissociation of the ionic compounds. The content of additive of the lithium salt type is less than 10% by weight and preferably less than 5% by weight. The mineral filler may consist of silica. The organic filler may consist of cellulose whiskers or microfibrils as described, for example, in FR-2 841 255. The mixture may be formed by extrusion or by coating a substrate.

When an ion-conducting material according to the invention is prepared in the form of a film, it may be used directly as electrolyte film for an electrochemical device. In this case, the process consists in preparing a solution of solvating polymer, of LiTFSI, of a lithium oligoether sulfate and optionally of one or more plasticizers or other additives in a solvent, degassing the solution obtained and then pouring it onto a substrate, and leaving the film to dry under vacuum by evaporation of the solvent. Solvents that may be used include volatile solvents, for instance acetonitrile, dimethylformamide or dichloromethane. A substrate whose surface is coated with a layer of an inert and nonstick material such as polytetrafluoro-ethylene is preferably used. The surface of the poured film may be delimited by a glass ring bonded to the surface of the substrate. When the film of material according to the invention is intended to be used as an electrolyte film, an ethylene oxide homopolymer, an ethylene oxide copolymer or a poly(oxyethylene)-based network is preferably used as solvating polymer.

The ion-conducting material of the present invention may be used as solid polymeric electrolyte or as constituent of a composite electrode. A subject of the invention is consequently also an electrochemical cell in which the electrolyte comprises an ion-conducting material according to the present invention and/or in which at least one of the electrodes is a composite electrode comprising such a material. In one particular embodiment, the electrolyte is a membrane separating the electrodes, the membrane consisting of an ion-conducting material according to the present invention, in which the polymeric solvent is plasticized by addition of a plasticizer mentioned previously.

Said electrochemical cell according to the present invention may be a rechargeable or nonrechargeable lithium electrochemical generator. Such a generator comprises a negative electrode and a positive electrode separated by a solid polymeric electrolyte, the solid polymeric electrolyte comprising an ion-conducting material according to the present invention. In such a generator, the electrodes may also contain an ion-conducting material of the present invention acting as conductive binder, when they are made in composite form.

The ion-conducting material according to the present invention may also be used as electrolyte or as binder for a composite electrode in other electrochemical systems such as electrochromic systems or light-modulating systems, or as a constituent of selective membranes or reference membranes in membrane sensors.

The present invention is illustrated by the examples below, to which it should not, however, be limited.

In the examples that follow:
the lithium oligoether monosulfates correspond to the formula R—[O—CH$_2$—CH$_2$]$_n$—O—SO$_3^-$Li$^+$ (I)

| POEMS 120 | n = 2    | R is CH$_3$  |
| POEMS 164 | n = 3    | R is CH$_3$  |
| POEMS 350 | n = 7.2  | R is CH$_3$  |
| POEMS 550 | n = 11.8 | R is CH$_3$  |
| POEMS 750 | n = 16.3 | R is CH$_3$, | the lithium oligoether disulfates correspond to the formula Li$^+$O$^-$SO$_2$—O—CH$_2$—[CH$_2$—O—CH$_2$]$_p$—CH$_2$—O—SO$_2$—O$^-$ Li$^+$

| POEDS 200  | p = 3.1  |
| POEDS 400  | p = 7.7  |
| POEDS 600  | p = 12.2 |
| POEDS 1000 | p = 21.4 |
| POEDS 2000 | p = 44   |

Films of material according to the invention were prepared in a glove box by evaporation. The LiTFSI salt is a product sold by the company Fluka. The solvating polymer used is a poly(oxyethylene) with a molar mass of 300 000 g/mol, referred to hereinbelow as POE3. The salts POEMS and POEDS are those that were synthesized previously. The various constituents were weighed out in a glove box. The solvent used to form the film is anhydrous acetonitrile dried over molecular sieve, supplied by Acros.

The conductivity measurements were performed on the films by electrochemical impedance spectroscopy in the following manner. A film 9 mm in diameter was mounted in a glove box in a leaktight button battery between a stainless-steel disk 19 mm in diameter and 1.5 mm thick and a stainless-steel disk 6 mm in diameter and 1 mm thick.

The transport number was measured according to the method of Bruce and Vincent [J. Evans, et al., Polymer, 28, 2324-2328, (1987)], said method being a combination of impedance spectroscopy measurement and chronoamperometry measurement.

The molar masses of the synthesized oligomers were obtained by steric exclusion chromatography, the machine being calibrated with PEG calibration samples of known and monodisperse mass Mn (the polydispersity index I being in the region of 1). The molar masses of the oligomers were determined by extrapolation by means of the PEG samples.

EXAMPLE 1

Synthesis of Oligoether Monosulfates POEMS

Several POEMS samples were prepared according to the following process.

20 grams (x mol) of monomethylated polyethylene glycol CH$_3$—(O—CH$_2$—CH$_2$)$_n$—OH (MPEG) of molar mass M g/mol (predried for 48 hours under vacuum at room temperature when n=2 or 3, at 80° C. when n is greater than 3) were dissolved in 250 cm$^3$ of dichloromethane in a 500 cm$^3$ three-necked round-bottomed flask placed in an ice bath. Throughout the synthesis, the solution was flushed with argon.

A 5% excess of chlorosulfonic acid (v cm$^3$) was then mixed with 40 cm$^3$ of dichloromethane, and this mixture was added dropwise to the three-necked round-bottomed flask via a dropping funnel.

After the addition, the reaction medium was flushed with argon for 1 hour. The solvent was then removed under vacuum on a rotary evaporator and the residue was taken up in 100 cm$^3$ of distilled water. The solution thus obtained was neutralized with 1 mol/L of lithium hydroxide solution. The neutralization was monitored with a pH-meter, and the addition of the lithium hydroxide solution was stopped as soon as the pH exceeded the pH of distilled water.

The water was then removed under vacuum on a rotary evaporator. The residue was taken up in acetonitrile and the solution obtained was centrifuged and then successively filtered twice on a 1 μm microporous PVDF filter, once on a 0.45 μm filter and once on a 0.22 μm filter. The acetonitrile was finally evaporated off under vacuum on a rotary evaporator.

The salt obtained was then dried under vacuum in a Büchi cell at 80° C. and stored in a glove box under argon. It corresponds to the formula

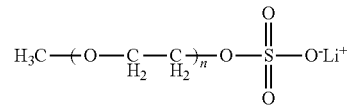

The particular preparation conditions and the product obtained in the various tests performed are given in table 1 below.

TABLE 1

| Sample    | MPEG x (mol) | MPEG M (g/mol) | HClSO$_3$H v (cm$^3$) | POEMS n |
|-----------|--------------|----------------|-----------------------|---------|
| POEMS120  | 0.17         | 120            | 11.6                  | 2       |
| POEMS164  | 0.12         | 164            | 8.5                   | 3       |
| POEMS350  | 0.057        | 350            | 4                     | 7.2     |
| POEMS550  | 0.0364       | 550            | 2.5                   | 11.8    |
| POEMS750  | 0.266        | 750            | 1.9                   | 16.3    |

For certain samples, the molar mass of the POEMS and that of the initial MPEG were measured by steric exclusion chromatography. Mw and Mn are the weight-average and number-average molar masses measured (as PEG equivalents), I is the polydispersity index, ΔM theoretical is the difference between the theoretical molar mass of the synthesized POEMS and the theoretical molar mass of the starting PEG. ΔM measured is the difference between the Mw of POEMS and the Mw of the PEG.

The results and the elution time t measured at the peak of the chromatogram are given in table 2 below.

TABLE 2

| Polymer | M theoretical | Mw (PEG equivalents) | Mn (PEG equivalents) | I | ΔM theoretical | ΔM measured | t (min) |
|---|---|---|---|---|---|---|---|
| MPEG | 164 | 129 | 112 | 1.16 | | | 22.6 |
| POEMS164 | 250.2 | 282 | 254 | 1.11 | 86.2 | 153 | 19.4 |
| MPEG | 350 | 357 | 346 | 1.03 | | | 19.2 |
| POEMS350 | 436.2 | 408 | 373 | 1.09 | 86.2 | 51 | 17.8 |
| MPEG | 550 | 530 | 439 | 1.21 | | | 17.4 |
| POEMS550 | 636.2 | 533 | 463 | 1.15 | 86.2 | 3 | 16.6 |
| MPEG | 750 | 637 | 566 | 1.13 | | | 17.0 |
| POEMS750 | 836.2 | 683 | 551 | 1.24 | 86.2 | 46 | 16.3 |

For certain POEMS samples, the glass transition temperature Tg, the melting point Tm, the heat of fusion $\Delta H_f$ and the intrinsic conductivity σ (which is the conductivity value of the pure product) were measured. The results are given in table 3 below.

TABLE 3

| Sample | Tg (° C.) | Tm (° C.) | $\Delta H_f$ (J/g) | σ (S/cm) at 80° C. |
|---|---|---|---|---|
| POEMS164 | −31 | 57 | 62 | $4 \times 10^{-5}$ |
| POEMS350 | −48 | | | $9 \times 10^{-5}$ |
| POEMS 550 | −59 | 34 | 100 | $9 \times 10^{-5}$ |
| POEMS750 | −60 | 40 | 120 | $9 \times 10^{-5}$ |

EXAMPLE 2

Preparation of Lithium Polyethylene Glycol Disulfate POEDS

Several POEDS samples were prepared according to the following process.

20 grams (x' mol) of polyethylene glycol (PEG) of molar mass M' g/mol, predried for 48 hours under vacuum at 80° C., were dissolved in 250 cm³ of dichloromethane in a 500 cm³ three-necked round-bottomed flask placed in an ice bath. Throughout the synthesis, the solution was flushed with argon.

A 5% excess of chlorosulfonic acid (v' cm³) was then mixed with 40 cm³ of dichloromethane, and this mixture was added dropwise to the three-necked round-bottomed flask via a dropping funnel.

After the addition, the reaction medium was flushed with argon for 1 hour. The solvent was then removed under vacuum on a rotary evaporator and the residue was taken up in 100 cm³ of distilled water. The solution thus obtained was neutralized with 1 mol/L lithium hydroxide solution. The neutralization was monitored with a pH-meter, and the addition of the lithium hydroxide solution was stopped as soon as the pH exceeded the pH of distilled water.

The water was then removed under vacuum on a rotary evaporator. The residue was taken up in acetonitrile and the solution obtained was centrifuged and then successively filtered twice on a 1 µm microporous PVDF filter, once on a 0.45 µm filter and once on a 0.22 µm filter. The acetonitrile was finally evaporated off under vacuum on a rotary evaporator. The salt obtained was then dried under vacuum in a Büchi cell at 80° C. and stored in a glove box under argon.

The particular preparation conditions and the product obtained in the various tests performed are indicated in table 4 below.

TABLE 4

| Sample | PEG x' (mol) | PEG M' (g/mol) | HClSO₃H v' (cm³) | POEDS n |
|---|---|---|---|---|
| POEDS200 | 0.2 | 200 | 14 | 3.1 |
| POEDS400 | 0.05 | 400 | 3.5 | 7.7 |
| POEDS600 | 0.088 | 600 | 5.8 | 12.2 |
| POEDS1000 | 0.03 | 1000 | 2.1 | 21.4 |
| POEDS2000 | 0.01 | 2000 | 0.7 | 44 |

For certain POEDS samples, the glass transition temperature Tg, the melting point Tm, the heat of fusion $\Delta H_f$ and the intrinsic conductivity σ were measured. The results are given in table 5 below.

TABLE 5

| Sample | Tg (° C.) | Tm (° C.) | $\Delta H_f$ (J/g) | σ (S/cm) at 80° C. |
|---|---|---|---|---|
| POEDS200 | −24 | 27 | 1.2 | |
| POEDS400 | −26 | 25 | 44 | $3.0 \times 10^{-6}$ |
| POEDS600 | −41 | 25 | 21 | $8.0 \times 10^{-6}$ |
| POEDS1000 | −58 | 42 | 85 | $1 \times 10^{-4}$ |
| POEDS2000 | −53 | 50 | 120 | $5.0 \times 10^{-5}$ |

EXAMPLE 3

Preparation of Films Containing a POEMS

Several samples of films were prepared using POE3, LITFSI and various POEMS prepared in Example 1. The procedure used is as follows.

0.6 g of POE3, y mg of LiTFSI and z mg of POEMS were introduced into a 30 mL flask and 8 mL of acetonitrile were then added. The solution was stirred magnetically for 4 hours. It was then degassed and then poured into a glass ring bonded onto a surface coated with a layer of Teflon®. The solvent was evaporated off overnight in a glove box under argon, equipped with a cold trap. The film was then dried under dynamic vacuum for 72 hours, and then stored in the glove box.

The cation transport number t⁺ for each film was determined.

The particular conditions for performing the various tests are collated in table 6 below. $O_t$ represents the total number of solvating oxygen atoms provided by POE3 and by the oligoether, $Li_{TFSI}$ represents the number of lithium atoms provided by LiTFSI, $Li_{POEMS}$ represents the number of lithium atoms provided by the oligoether, $Li_t$ represents the total number of Li atoms and t⁺ represents the cation transport number.

TABLE 6

| Film | LiTFSI y (in mg) | Oligoether (nature) | Oligoether z (in mg) | $O_t/Li_{TFSI}$ | $O_t/Li_{POEMS}$ | $O_t/Li_t$ | $t^+$ at 70° C. |
|---|---|---|---|---|---|---|---|
| 164a | 130.5 | POEMS164 | 126.4 | 33.3 | 30 | 15.2 | 0.21 |
| 164b | 130.5 | POEMS164 | 92.21 | 32.4 | 40 | 17.9 | 0.27 |
| 164c | 130.5 | POEMS164 | 72.59 | 31.9 | 50 | 19.5 | 0.30 |
| 164d | 130.5 | POEMS164 | 59.86 | 31.6 | 60 | 20.7 | 0.20 |
| 164e | 65.23 | POEMS164 | 126.4 | 66.7 | 30 | 20.7 | 0.21 |
| 164f | 65.23 | POEMS164 | 92.21 | 64.9 | 40 | 24.7 | 0.25 |
| 164g | 65.23 | POEMS164 | 72.59 | 63.8 | 50 | 28 | 0.23 |
| 164h | 65.23 | POEMS164 | 59.86 | 63.2 | 60 | 30.8 | 0.21 |
| 164i | 65.23 | POEMS164 | 126.4 | 100 | 30 | 23.1 | 0.27 |
| 164j | 43.48 | POEMS164 | 92.21 | 97.3 | 40 | 28.3 | 0.30 |
| 164k | 43.48 | POEMS164 | 72.59 | 95.8 | 50 | 32.8 | 0.26 |
| 164l | 43.48 | POEMS164 | 59.86 | 94.7 | 60 | 36.7 | 0.27 |
| 350a | 130.5 | POEMS350 | 261.12 | 39.5 | 30 | 17.1 | 0.24 |
| 350b | 130.5 | POEMS350 | 181.5 | 36.6 | 40 | 19.1 | 0.24 |
| 350c | 65.23 | POEMS350 | 261.12 | 79 | 30 | 21.7 | 0.30 |
| 350d | 65.23 | POEMS350 | 181.5 | 73.2 | 40 | 25.9 | 0.27 |
| 350e | 43.48 | POEMS350 | 261.12 | 118.6 | 30 | 23.9 | 0.30 |
| 350f | 43.48 | POEMS350 | 181.5 | 109.9 | 40 | 29.3 | 0.27 |
| 550a | 130.5 | POEMS550 | 476.0 | 49.4 | 30 | 18.7 | 0.25 |
| 550b | 130.5 | POEMS550 | 307.3 | 42.5 | 40 | 20.6 | 0.28 |
| 550c | 65.23 | POEMS550 | 476.0 | 98.7 | 30 | 23 | 0.26 |
| 550d | 65.23 | POEMS550 | 307.3 | 85 | 40 | 27.2 | 0.29 |
| 550e | 43.48 | POEMS550 | 476.0 | 148.1 | 30 | 24.9 | 0.33 |
| 550f | 43.48 | POEMS550 | 307.3 | 127.6 | 40 | 30.5 | 0.32 |
| 750a | 130.5 | POEMS750 | 833.4 | 65.8 | 30 | 20.6 | 0.27 |
| 750b | 130.5 | POEMS750 | 481.5 | 50.7 | 40 | 22.4 | 0.29 |
| 750c | 65.23 | POEMS750 | 833.4 | 131.6 | 30 | 24.4 | 0.31 |
| 750d | 65.23 | POEMS750 | 481.5 | 101.3 | 40 | 28.7 | 0.31 |
| 20TFS | 197.7 | — | | 20 | | | 0.13 |
| 30TFS | 130.5 | — | | 30 | | | 0.13 |
| 40TFS | 97.84 | — | | 40 | | | 0.14 |

These results clearly show that, for an overall ratio $O_t/Li_t$ of less than 40, the transport number is markedly higher when the material contains a mixture of salts instead of only the LiTFSI salt.

EXAMPLE 4

Preparation of Films Containing a POEDS

Several samples of films were prepared using POE3, LiTFSI and various POEDS prepared in Example 2. The procedure used is as follows.

0.6 g of POE3, y mg of LiTFSI and z mg of POEDS were introduced into a 30 mL flask, and 8 mL of acetonitrile were then added. The solution was stirred magnetically for 4 hours. It was then degassed, and then poured into a glass ring bonded onto a surface coated with a layer of Teflon®. The solvent was evaporated off overnight in a glove box under argon, equipped with a cold trap. The film was then dried under dynamic vacuum for 72 hours, and then stored in the glove box.

The cation transport number $t^+$ for each film was determined.

The particular conditions for performing the various tests are collated in table 7 below. $O_t$ represents the total number of solvating oxygen atoms provided by POE3 and by the oligoether, $Li_{TFSI}$ represents the number of lithium atoms provided by LiTFSI, $Li_{POEDS}$ represents the number of lithium atoms provided by the oligoether, $Li_t$ represents the total number of Li atoms and $t^+$ represents the cation transport number.

TABLE 7

| Film | LiTFSI y (in mg) | Oligoether (nature) | Oligoether z (in mg) | $O_t/Li_{TFSI}$ | $O_t/Li_{POEMS}$ | $O_t/Li_t$ | $t^+$ at 70° C. |
|---|---|---|---|---|---|---|---|
| 200a | 130.5 | POEDS200 | 89.30 | 31.7 | 30 | 15.4 | 0.21 |
| 200b | 130.5 | POEDS200 | 66.07 | 31.2 | 40 | 17.5 | 0.26 |
| 200d | 65.23 | POEDS200 | 66.07 | 62.4 | 40 | 24.4 | 0.22 |
| 400b | 130.5 | POEDS400 | 107.9 | 33.2 | 40 | 18.1 | 0.21 |
| 400c | 65.23 | POEDS400 | 149.2 | 68.8 | 30 | 20.9 | 0.24 |
| 400d | 65.23 | POEDS400 | 107.9 | 66.4 | 40 | 25 | 0.28 |
| 600a | 130.5 | POEDS600 | 220.5 | 37.7 | 30 | 16.7 | 0.20 |
| 600b | 130.5 | POEDS600 | 155.4 | 35.4 | 40 | 18.8 | 0.22 |
| 600d | 65.23 | POEDS600 | 155.4 | 70.8 | 40 | 25.6 | 0.24 |
| 1000e | 43.48 | POEDS1000 | 413.3 | 139.6 | 30 | 24.7 | 0.28 |
| 1000f | 43.48 | POEDS1000 | 155.4 | 122.7 | 40 | 30.2 | 0.31 |
| 2000b | 130.5 | POEDS2000 | 823.9 | 66.8 | 40 | 25 | 0.25 |
| 2000d | 65.23 | POEDS2000 | 823.9 | 133.5 | 40 | 30.8 | 0.26 |
| 20TFS | 195.7 | — | | 20 | | | 0.13 |
| 30TFS | 130.5 | — | | 30 | | | 0.13 |
| 40TFS | 97.84 | — | | 40 | | | 0.14 |

The invention claimed is:

1. An ion-conducting material comprising at least one ionic compound dissolved in a solvating polymer, wherein:
the ionic compound is a mixture of a lithium bis(trifluoromethanesulfonyl)imide (LiTFSI) and of at least one lithium oligoether sulfate selected from the group consisting of lithium oligoether monosulfates corresponding to the formula R—[O—CH$_2$—CH$_2$)]$_n$—O—SO$_3^-$Li$^+$(I) in which R is a group C$_m$H$_{2m+1}$ with $1 \leq m \leq 4$ and $2 \leq n \leq 17$, and lithium oligoether disulfates corresponding to the formula Li$^+$O$^-$SO$_2$—O—CH$_2$—[CH$_2$—O—CH$_2$]$_p$—CH$_2$—O—SO$_2$—O$^-$Li$^+$(II) in which $3 \leq p \leq 45$,
the overall ratio O$_t$/Li$_t$ is less than or equal to 40, O$_t$ representing the total number of O atoms provided by the solvating polymer and by the oligoether, and
the LiTFSI content is such that the ratio O$_t$/LiTFSI is greater than or equal to 20.

2. The ion-conducting material as claimed in claim 1, wherein the solvating polymer is selected from the group consisting of ethylene oxide homopolymers and copolymers, propylene oxide homopolymers and copolymers, and dioxolane homopolymers and copolymers.

3. The ion-conducting material as claimed in claim 1, wherein the solvating polymer is chosen from copolymers of ethylene oxide and of a crosslinkable comonomer.

4. The ion-conducting material as claimed in claim 1, wherein the solvating polymer is chosen from poly(oxyethylenes) with a molar mass of from 100 000 g/mol to 5×10$^6$ g/mol.

5. The ion-conducting material as claimed in claim 1, further comprising a plasticizer chosen from polar aprotic liquid solvents, the amount of liquid solvent being less than 30% by weight.

6. The ion-conducting material as claimed in claim 1, wherein the ionic compound is a mixture of LiTFSI and of an oligoether monosulfate of formula (I) in which R is a methyl group and $n \leq 12$.

7. The ion-conducting material as claimed in claim 1, wherein the ionic compound is a mixture of LiTFSI and of an oligoether disulfate of formula (II) in which $p \leq 12$.

8. The ion-conducting material as claimed in claim 1, further comprising at least one additive selected from the group consisting of mineral fillers, lithium salts, organic fillers of cellulose type and flame retardants.

9. A solid polymeric electrolyte comprising a membrane of ion-conducting material as claimed in claim 1.

10. A composite electrode comprising an ion-conducting material as claimed in claim 1.

11. An electrochemical cell comprising two electrodes separated by an electrolyte, wherein the electrolyte comprises an ion-conducting material as claimed in claim 1.

12. An electrochemical cell comprising two electrodes separated by an electrolyte, wherein at least one of the electrodes is a composite electrode comprising a material as claimed in claim 1.

13. A lithium electrochemical generator, comprising a negative electrode and a positive electrode separated by a solid polymeric electrolyte, wherein the electrolyte comprises an ion-conducting material as claimed in claim 1.

14. The electrochemical generator as claimed in claim 11, wherein at least one of the electrodes is a composite electrode comprising a material as claimed in claim 1, as binder.

15. An electrochromic system, in which the electrolyte and/or the binder for a composite electrode comprises an ion-conducting material as claimed in claim 1.

16. A light-modulating system, in which the electrolyte and/or the binder for a composite electrode comprises an ion-conducting material as claimed in claim 1.

17. A selective membrane comprising an ion-conducting material as claimed in claim 1.

18. A reference membrane for a membrane sensor; comprising an ion-conducting material as claimed in claim 1.

19. An ion-conducting material comprising
a solvating polymer;
a lithium bis(trifluoromethanesulfonyl)imide (LiTFSI); and
at least one lithium oligoether sulfate selected from the group consisting of
(a) lithium oligoether monosulfates corresponding to the formula R—[O—CH$_2$—CH$_2$)]$_n$—O—SO$_3^-$Li$^+$(I) in which R is a group C$_m$H$_{2m+1}$ with $1 \leq m \leq 4$ and $2 \leq n \leq 17$, and
(b) lithium oligoether disulfates corresponding to the formula Li$^+$O$^-$SO$_2$—O—CH$_2$—[CH$_2$—O—CH$_2$]$_p$—CH$_2$—O—SO$_2$—O$^-$Li$^+$(II) in which $3 \leq p \leq 45$,
wherein the overall ratio O$_t$/Li$_t$ is less than or equal to 40, where O$_t$ represents the total number of O atoms provided by the solvating polymer and by the oligoether and Li$_t$ represents the total number of Li atoms, and
wherein the LiTFSI content is such that the ratio O$_t$/LiTFSI is greater than or equal to 20.

* * * * *